(12) United States Patent
Stimpson (10) Patent No.: US 11,369,066 B2
(45) Date of Patent: Jun. 28, 2022

(54) SOUND ATTENUATION DEVICE (71) Applicant: Darryl Stimpson, Dallas, TX (US)

(72) Inventor: Darryl Stimpson, Dallas, TX (US)

(*) Notice: Subject to any disclaimer, the term of this patent is extended or adjusted under 35 U.S.C. 154(b) by 492 days.

(21) Appl. No.: 16/506,369

(22) Filed: Jul. 9, 2019

(65) Prior Publication Data

US 2021/0007293 A1    Jan. 14, 2021

(51) Int. Cl.
*A01G 20/47* (2018.01)
*F04D 29/66* (2006.01)
*G10K 11/168* (2006.01)

(52) U.S. Cl.
CPC .......... *A01G 20/47* (2018.02); *F04D 29/664* (2013.01); *G10K 11/168* (2013.01)

(58) Field of Classification Search
CPC ...... G10K 11/168; F04D 29/664; A01G 20/47
USPC ........................................ 181/141, 205, 198
See application file for complete search history.

(56) References Cited

U.S. PATENT DOCUMENTS

| | | | |
|---|---|---|---|
| 2,345,705 A * | 4/1944 | Kuntz | E04H 1/14 52/145 |
| 4,258,821 A | 3/1981 | Wendt | |
| 4,658,878 A * | 4/1987 | Williams | E06B 3/94 160/84.09 |
| 5,052,073 A * | 10/1991 | Iida | F16M 11/22 15/327.5 |
| 5,268,540 A * | 12/1993 | Rex | E01F 8/0058 181/210 |
| 5,533,869 A * | 7/1996 | Garrison | A47L 5/14 123/41.65 |
| 6,755,278 B2 | 6/2004 | Huhn | |
| 7,490,697 B1 | 2/2009 | Williamson, Jr. | |
| D596,122 S * | 7/2009 | Imai | D13/122 |
| 9,599,124 B2 * | 3/2017 | Roberge | F04D 29/4226 |
| 2006/0103172 A1 * | 5/2006 | Veen | B60R 13/0815 296/214 |

* cited by examiner

*Primary Examiner* — Forrest M Phillips (57) ABSTRACT

A sound attenuation device for reducing noise generated by a leaf blower includes a shell, which is insulated and defines an interior space. A first cutout that is positioned in a front of the shell and a second cutout that extends from the front into a first side of the shell are shaped substantially complementarily to an engine compartment of a leaf blower and to a cross-sectional profile of a pipe of the leaf blower, respectively. The first cutout is configured to insert the engine compartment into the interior space so that the pipe extends from the shell through the second cutout. A coupler that is coupled to the shell proximate to the front is configured to couple the shell to the leaf blower so that the shell substantially encapsulates the engine compartment. The shell is configured to attenuate sound that is generated by an engine of the leaf blower.

9 Claims, 7 Drawing Sheets

SOUND ATTENUATION DEVICE

CROSS-REFERENCE TO RELATED APPLICATIONS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relate to attenuation devices and more particularly pertain to a new attenuation device for reducing noise generated by a leaf blower.

BRIEF SUMMARY OF THE INVENTION

An embodiment of the disclosure meets the needs presented above by generally comprising a shell, which is insulated and defines an interior space. A first cutout that is positioned in a front of the shell and a second cutout that extends from the front into a first side of the shell are shaped substantially complementarily to an engine compartment of a leaf blower and to a cross-sectional profile of a pipe of the leaf blower, respectively. The first cutout is configured to insert the engine compartment into the interior space so that the pipe extends from the shell through the second cutout. A coupler that is coupled to the shell proximate to the front is configured to couple the shell to the leaf blower so that the shell substantially encapsulates the engine compartment. The shell is configured to attenuate sound that is generated by an engine of the leaf blower.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 10 thereof, a new attenuation device embodying the principles and concepts of an embodiment of the disclosure and generally designated by the reference numeral 10 will be described.

As best illustrated in FIGS. 1 through 10, the sound attenuation device 10 generally comprises a shell 12, which is insulated and defines an interior space 14. The shell 12 may comprise plastic or other type of flexible water resistant material, such as, but not limited to, polyurethane coated polyester, polyethylene, and the like so that the shell 12 is substantially impermeable to water.

Figure 2:
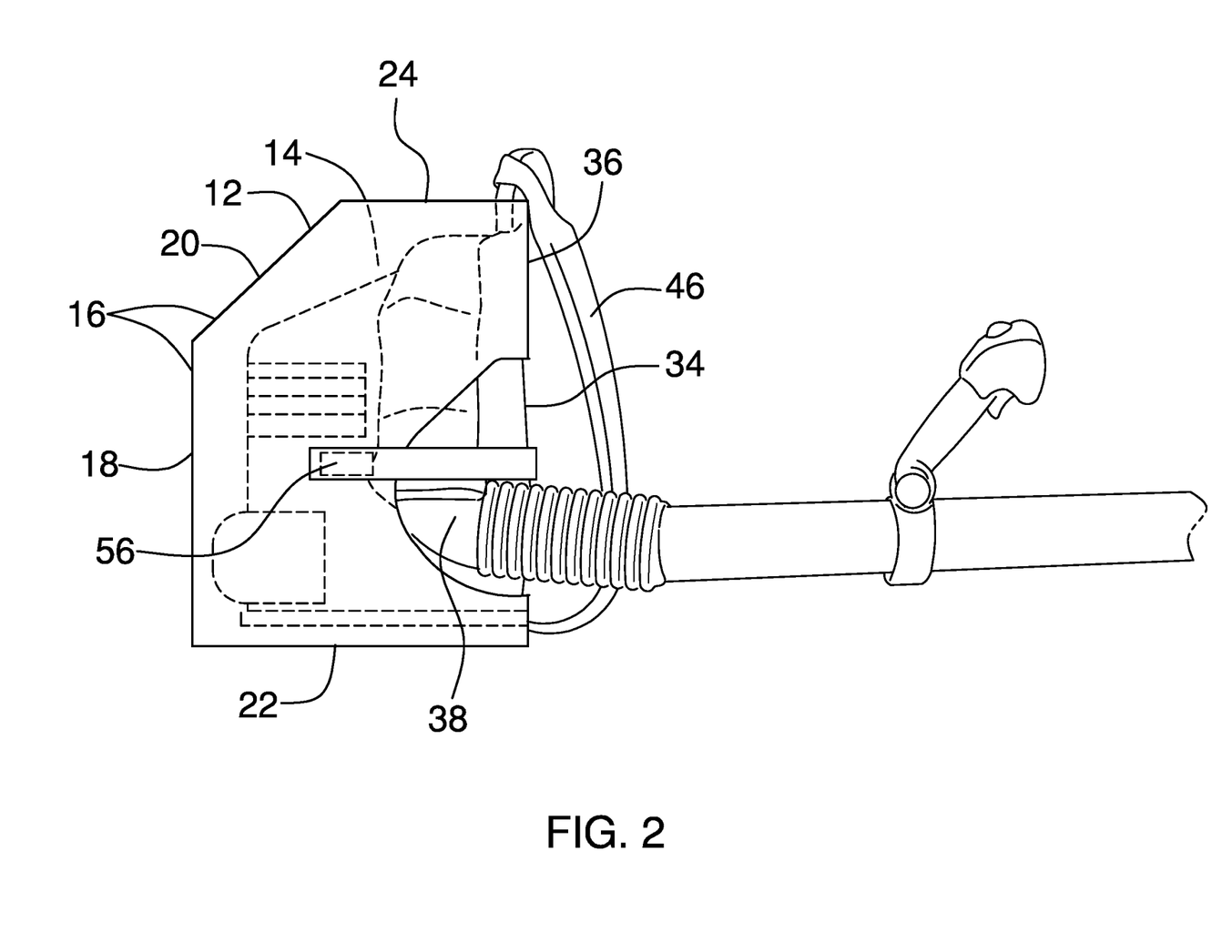
FIG. 2 is a first side view of an embodiment of the disclosure.

The shell 12 is substantially rectangularly box shaped. The shell 12 has a back 16 that comprises a first section 18 and a second section 20. The first section 18 extends perpendicularly from a bottom 22 of the shell 12. The second section 20 extends transversely from the first section 18 to a top 24 of the shell 12, as shown in FIG. 2, so that the top 24 is circumferentially smaller than the bottom 22.

Figure 8:
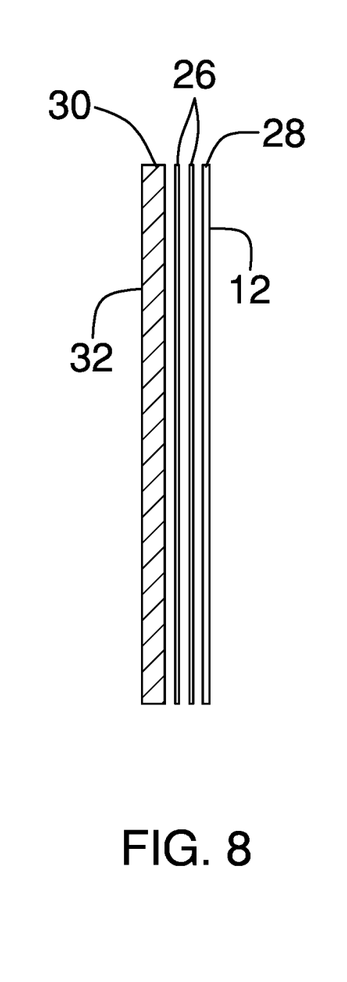
FIG. 8 is side view of an embodiment of the disclosure.
Figure 9:
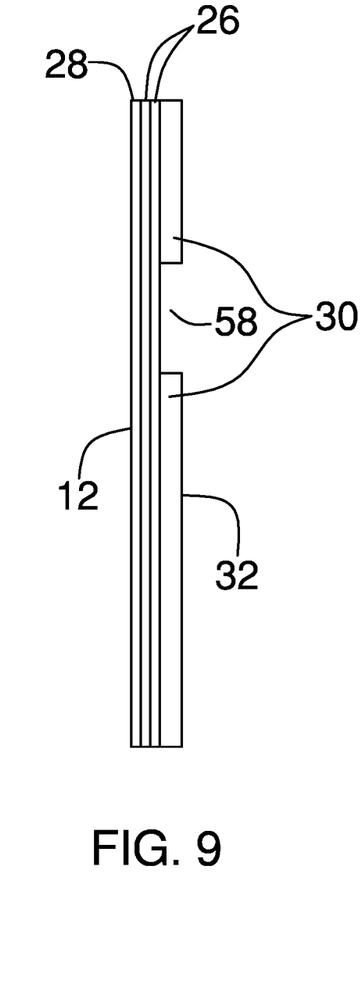
FIG. 9 is a side view of an embodiment of the disclosure.

A first panel 26 is positioned in the interior space 14 and is coupled to the back 16 of the shell 12 so that the first panel 26 is positioned to rigidify the back 16. The first panel 26 may comprise paperboard, such as double-layered cardboard, as shown in FIG. 8, or other type of substantially rigid material, such as, but not limited to, wood, plastic, metal, and the like.

A second panel 28 is positioned between the first panel 26 and the shell 12. The second panel 28 comprises foamed elastomer so that the second panel 28 is configured for acoustic dampening. The second panel 28 may comprise extruded polystyrene foam or other type of foamed elastomer such as, but not limited to, polyurethane foam, polyisocyanurate foam, and the like.

An insulation layer 30 positioned in the interior space 14 and is coupled to an inner surface 64 of the shell 12. The insulation layer 30 is configured for acoustic dampening.

The insulation layer 30 comprises high-temperature mineral wool, such as alkaline earth silicate wool, alumino silicate wool, polycrystalline wool, or Kaowool, and the like, so that the insulation layer 30 is fire resistant.

A mesh 32 is coupled to and overlays the insulation layer 30. The mesh 32 may comprise metal or other type of durable semi-rigid material such as, but not limited to, plastic and the like. The mesh 32 is configured to protect the insulation layer 30 from physical damage caused by contact with the engine compartment of the leaf blower. The layering of the shell 12, the first panel 26, the second panel 28, the insulation layer 30, and the mesh 32 is shown in detail in FIG. 9 (exploded view from a first side 40 of the shell 12) FIG. 8 (view from a second side 54 of the shell 12).

A first cutout 34 that is positioned in a front 36 of the shell 12 is shaped substantially complementarily to an engine compartment of a leaf blower. The first cutout 34 extends from the bottom 22 of the shell 12 to proximate to the top 24 of the shell 12. The first cutout 34 is arcuate distal from the bottom 22 so that the first cutout 34 is shaped substantially complementarily to a front edge of the engine compartment of the leaf blower.

A second cutout 38 that extends from the front 36 of the shell 12 into the first side 40 of the shell 12 is shaped substantially complementarily to a cross-sectional profile of a pipe of the leaf blower. The first cutout 34 is configured to insert the engine compartment of the leaf blower into the interior space 14 so that the pipe extends from the shell 12 through the second cutout 38, as shown in FIG. 2. With the shell 12 thus positioned, the air intake of the leaf blower is not covered by the shell 12. The second cutout 38 is positioned proximate to the bottom 22 of the shell 12 and is contiguous to the first cutout 34.

Figure 3:
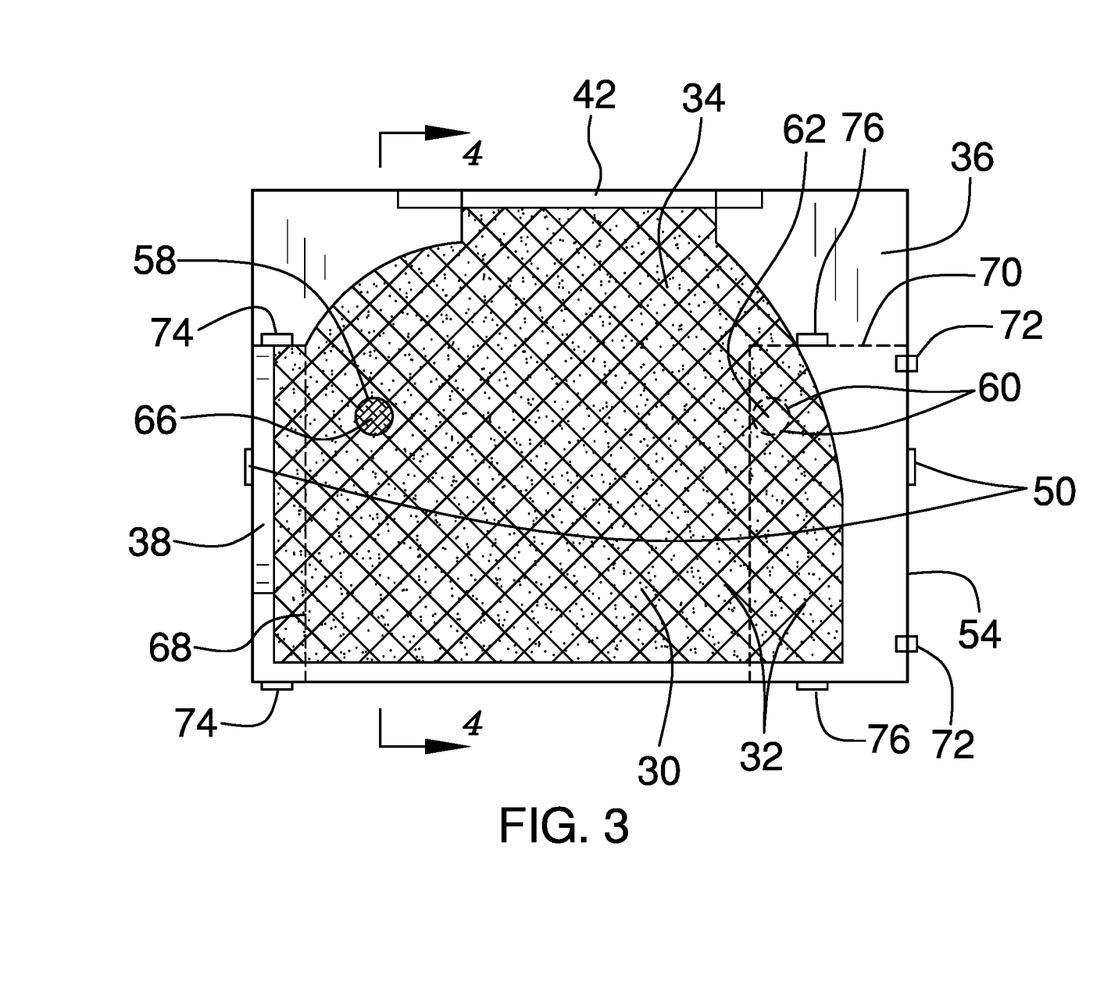
FIG. 3 is a front view of an embodiment of the disclosure.
Figure 4:
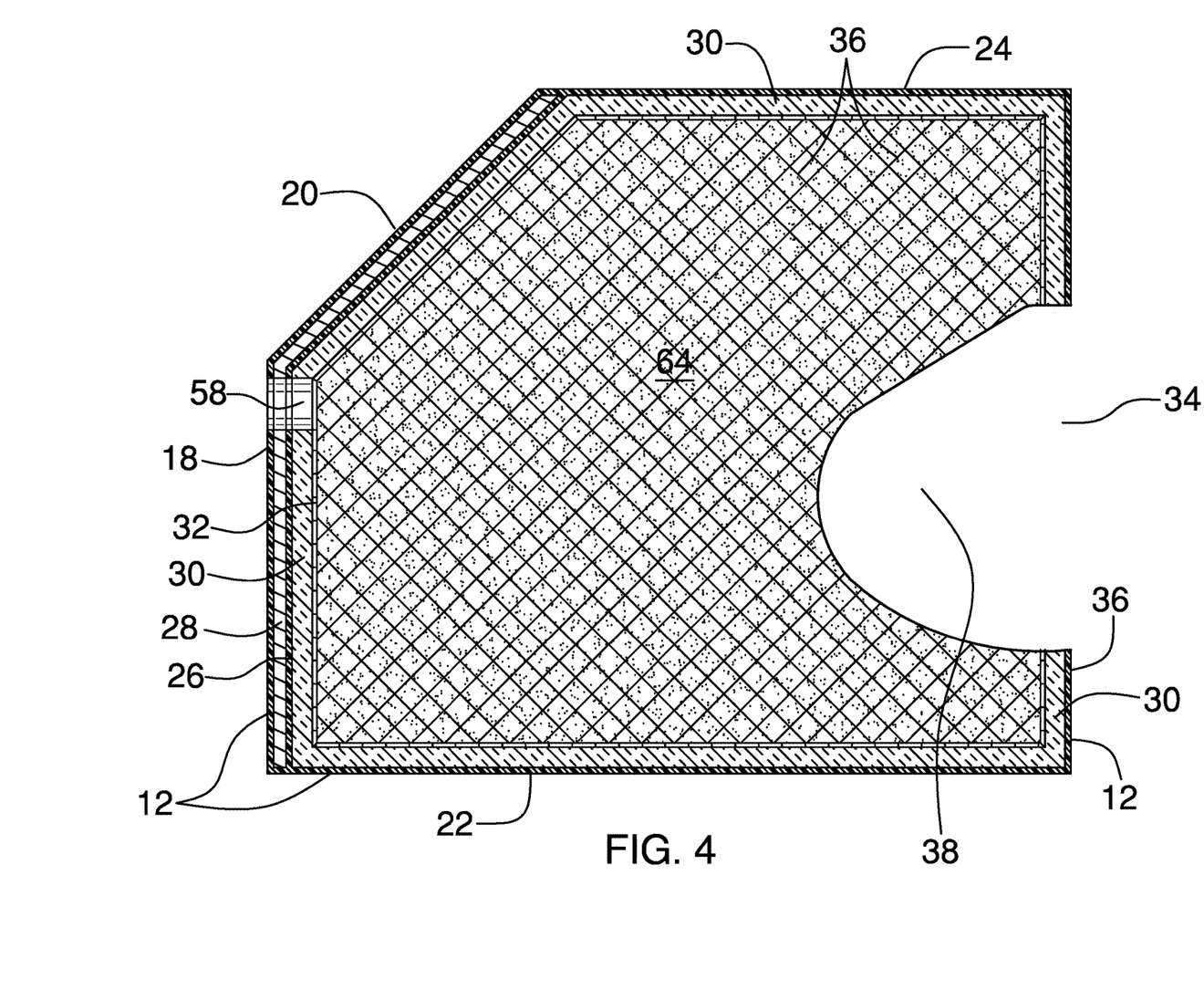
FIG. 4 is a cross-sectional view of an embodiment of the disclosure.
Figure 5:
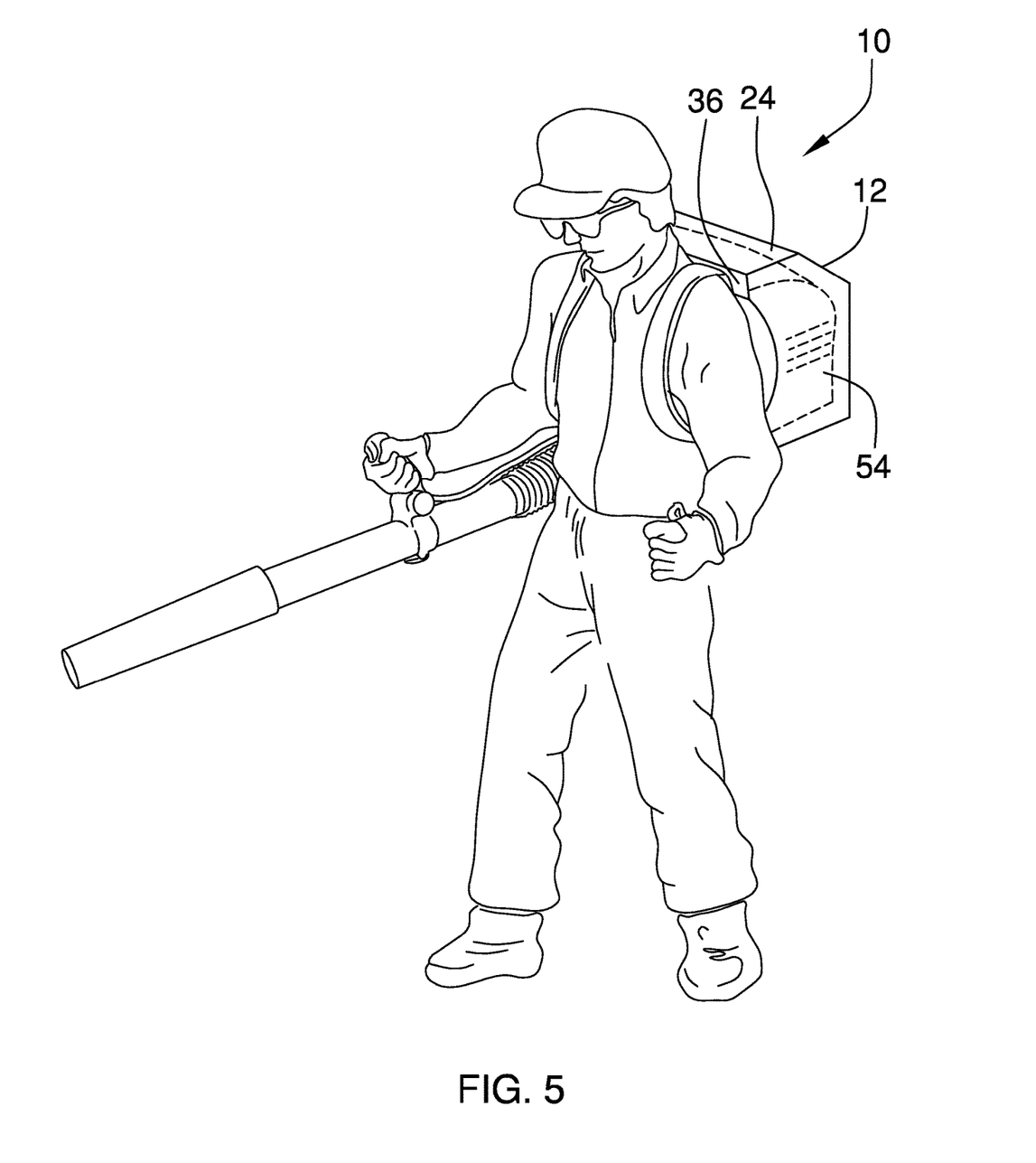
FIG. 5 is an in-use view of an embodiment of the disclosure.
Figure 6:
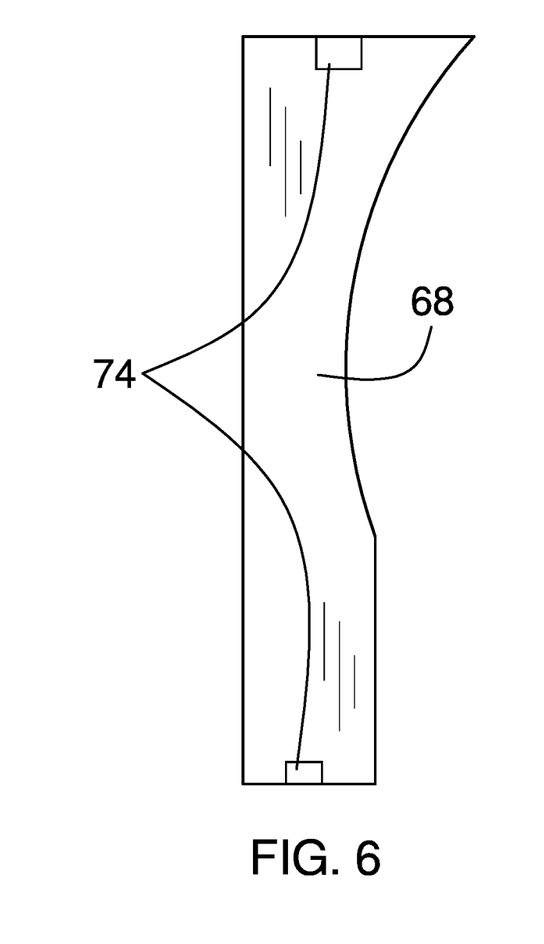
FIG. 6 is a front view of an embodiment of the disclosure.
Figure 7:
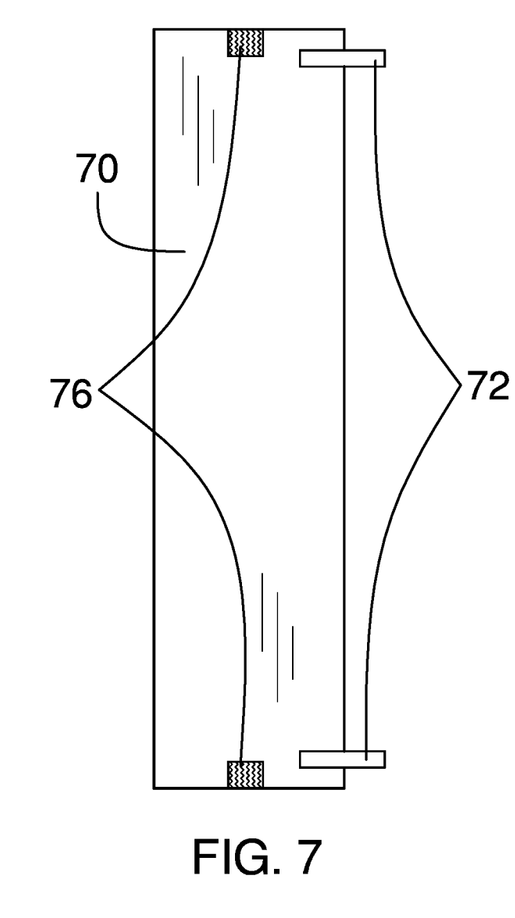
FIG. 7 is a rear view of an embodiment of the disclosure.

A third cutout 42 that extends from the front 36 of the shell 12 into the top 24 of the shell 12, as shown in FIG. 3, is contiguous to the first cutout 34 and is shaped substantially complementarily to a handle of the leaf blower. The third cutout 42 is configured to insert the handle concurrently with the engine compartment of the leaf blower being inserted through the first cutout 34 into the interior space 14.

A coupler 44 that is coupled to the shell 12 proximate to the front 36 is configured to couple the shell 12 to the leaf blower so that the shell 12 substantially encapsulates the engine compartment. The shell 12 is configured to attenuate sound that is generated by an engine of the leaf blower. Noise generated by engine powered leaf blowers can be irritating to a user and to persons proximate to the leaf blower and also has the potential to cause hearing damage. The present invention serves to mitigate the noise generated by the leaf blower, thus lowering the potential for irritation and hearing damage.

The coupler 44 may comprise a strap 46, a pair of first connectors 48, and a pair of second connectors 50, or other combination of fastening means such as, but not limited to, a combination of rings and a hook equipped bungee cord, and the like.

Figure 1:
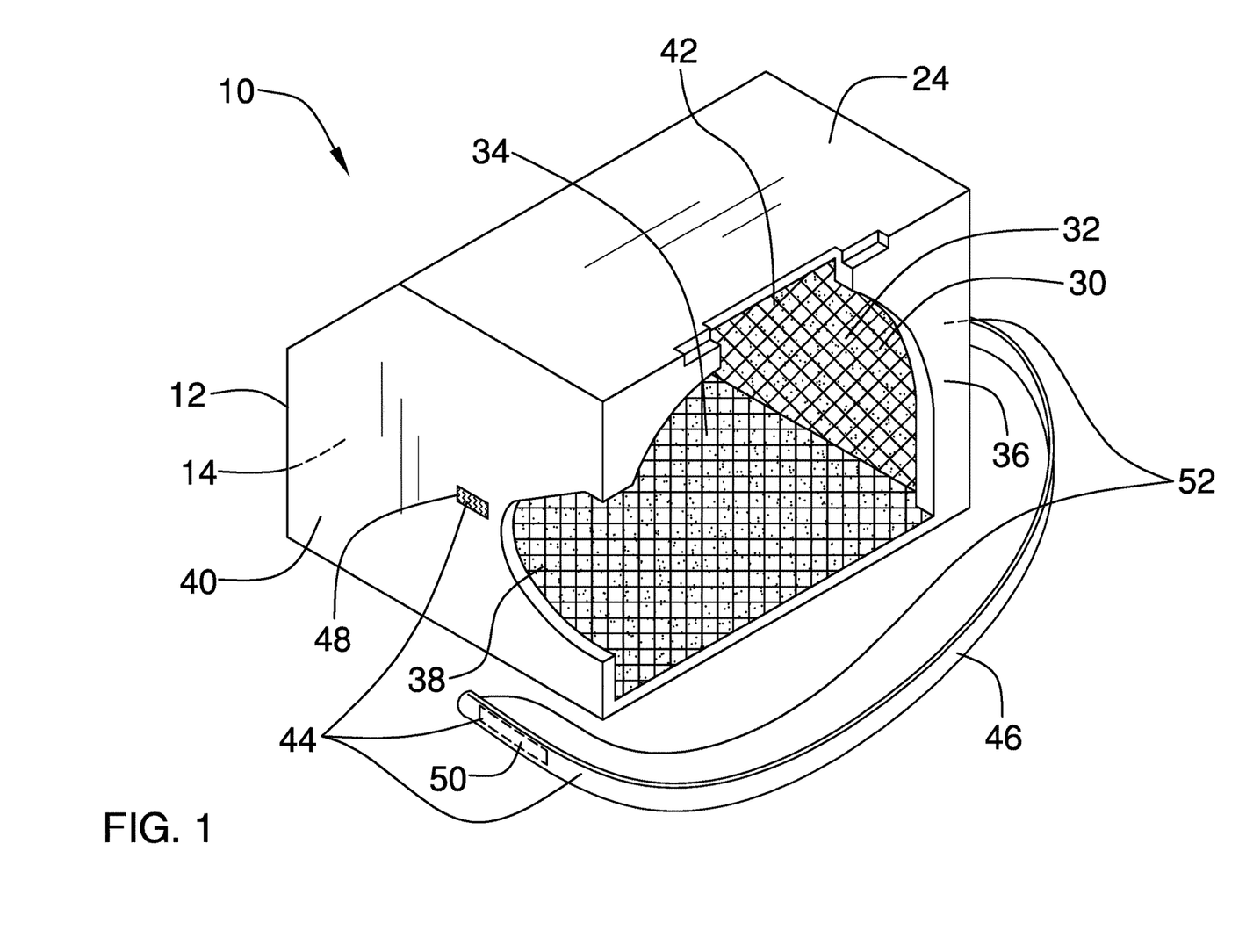
FIG. 1 is an isometric perspective view of a sound attenuation device according to an embodiment of the disclosure.

Each first connector 48 is coupled to the strap 46 proximate to a respective opposing end 52 of the strap 46. The second connectors 50 are coupled singly to the first side 40 and the second side 54 of the shell 12 proximate to the front 36 of the shell 12. The second connectors 50 are complementary to the first connectors 48. The strap 46 is configured to be positioned around the engine compartment of the leaf blower, positioning each second connector 50 to be removably coupled to a respective first connector 48 to couple the shell 12 to the engine compartment. The second connector 50 and the respective first connector 48 may comprise a first hook and loop fastener 56, as shown in FIG. 1, or other type of releasable fastener such as, but not limited to, buttons, snaps, and the like.

A first orifice 58 is positioned in the back 16 of the shell 12 and extends through the second panel 28, the first panel 26, and the insulation layer 30. The first orifice 58 is positioned proximate the first side 40 of the shell 12 and is configured to align with an exhaust port of the engine of the leaf blower to vent exhaust from the interior space 14.

A plurality of perforations 60 is positioned in the back 16 of the shell 12 proximate the second side 54 of the shell 12. The plurality of perforations 60 is circularly arranged and is positioned to allow the user to optionally create a second orifice 62 through the shell 12, the second panel 28, the first panel 26, and the insulation layer 30, should the engine have an exhaust port directed toward the plurality of perforations 60. The second orifice 62 is configured to align with an exhaust port of the engine of the leaf blower to vent exhaust from the interior space 14.

A plug 66, which comprise steel wool, is positioned in the first orifice 58. The plug 66 is configured to vent exhaust from the interior space 14 and to attenuate the sound that is generated by the engine of the leaf blower.

In another embodiment, shown in FIG. 3, the device 10 also comprises a left side panel 68 and a right side panel 70. The left side panel 68 is selectively couplable to the front 36 of the shell 12 proximate to the first side 40 of the shell 12 so that the left side panel 68 partially covers the first cutout 34. The right side panel 70 is hingedly coupled to the second side 54 of the shell 12 and is selectively couplable to the front 36 of the shell 12 proximate to the second side 54 of the shell 12 so that the right side panel 70 partially covers the first cutout 34. The left side panel 68 and the right side panel 70 are positioned to rigidify the front 36 of the shell 12 and to close gaps between the shell 12 and the engine compartment of the leaf blower.

Each of a pair of hinges 72 is coupled to and extends between the right side panel 70 and the second side 54 of the shell 12 so that the right side panel 70 is hingedly coupled to the shell 12.

Figure 10:
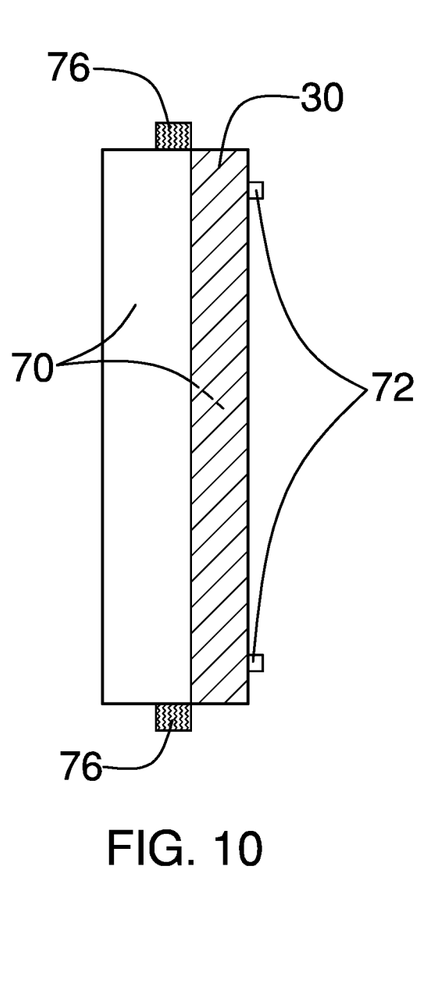
FIG. 10 is a cross-sectional view of an embodiment of the disclosure.

A pair of second hook and loop fasteners 74 is coupled to and extends between the left side panel 68 and the shell 12, as shown in FIG. 3, so that the left side panel 68 is selectively couplable to the shell 12. A pair of third hook and loop fasteners 76 is coupled to and extends between the right side panel 70 and the shell 12, as shown in FIG. 3, so that the right side panel 70 is selectively couplable to the shell 12. FIG. 10 shows a view of the right side panel 70 from the interior space 14. The pair of second hook and loop fasteners 74 and the pair of third hook and loop fasteners 76 also may comprise other fastening means, such as, but not limited to, buttons, snaps, and the like.

In use, the shell 12 is positioned around the engine compartment of the leaf blower. The strap 46 is looped around the engine compartment, positioning each second connector 50 to be removably coupled to a respective first connector 48 to couple the shell 12 to the engine compartment. The shell 12 is configured to attenuate the sound that is generated by the engine of the leaf blower.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A sound attenuation device comprising:
    a shell defining an interior space, the shell being insulated;
    a first cutout positioned in a front of the shell, the first cutout being shaped substantially complementarily to an engine compartment of a leaf blower;
    a second cutout extending from the front of the shell into a first side of the shell, the second cutout being shaped substantially complementarily to a cross-sectional profile of a pipe of the leaf blower wherein the first cutout is configured for inserting the engine compartment of the leaf blower into the interior space such that the pipe extends from the shell through the second cutout;
    a coupler coupled to the shell proximate to the front, the coupler being configured for coupling the shell to the leaf blower such that the shell substantially encapsulates the engine compartment wherein the shell is configured for attenuating sound generated by an engine of the leaf blower;
    the shell comprising at least one of polyurethane coated polyester, polyethylene, and plastic such that the shell is substantially impermeable to water, the shell being substantially rectangularly box shaped, the shell having a back comprising a first section and a second section, the first section extending perpendicularly from a bottom of the shell, the second section extending transversely from the first section to a top of the shell such that the top is circumferentially smaller than the bottom;
    a first panel positioned in the interior space and coupled to the back of the shell such that the first panel is positioned for rigidifying the back, the first panel comprising paperboard;
    a second panel positioned between the first panel and the shell, the second panel comprising foamed elastomer wherein the second panel is configured for acoustic dampening, the second panel comprising extruded polystyrene foam;
    an insulation layer positioned in the interior space and coupled to an inner surface of the shell wherein the insulation layer is configured for acoustic dampening, the insulation layer comprising high-temperature mineral wool such that the insulation layer is fire resistant;
    a first orifice positioned in the back of the shell and extending through the second panel, the first panel, and the insulation layer, the first orifice being positioned proximate the first side of the shell wherein the first orifice is configured for aligning with an exhaust port of the engine of the leaf blower for venting exhaust from the interior space; and
    a plug positioned in the first orifice, the plug comprising steel wool where the plug is configured for venting of exhaust from the interior space and for attenuating the sound generated by the engine of the leaf blower; and
    a plurality of perforations positioned in the back of the shell proximate a second side of the shell, the plurality of perforations being circularly arranged such that the plurality of perforations is positioned for creating a second orifice through the shell, the second panel, the first panel, and the insulation layer wherein the second orifice is configured for aligning with an exhaust port of the engine of the leaf blower for venting exhaust from the interior space.

2. The device of claim 1, further including a mesh coupled to and overlaying the insulation layer, the mesh comprising metal wherein the mesh is configured for protecting the insulation layer from physical damage from contacting the engine compartment of the leaf blower.

3. The device of claim 1, further comprising:
    the first cutout extending from a bottom of the shell to proximate to a top of the shell, the first cutout being arcuate distal from the bottom such that the first cutout is shaped substantially complementarily to a front edge of the engine compartment of the leaf blower; and
    the second cutout being positioned proximate to the bottom of the shell, the second cutout being contiguous to the first cutout.

4. The device of claim 3, further including a third cutout extending from the front of the shell into the top of the shell, the third cutout being contiguous to the first cutout, the third cutout being shaped substantially complementarily to a handle of the leaf blower wherein the third cutout is configured for inserting the handle concurrently with the engine compartment of the leaf blower being inserted through the first cutout into the interior space.

5. The device of claim 1, further including the coupler comprising:
    a strap;
    a pair of first connectors, each first connector being coupled to the strap proximate to a respective opposing end of the strap; and
    a pair of second connectors, the second connectors being coupled singly to the first side and a second side of the shell proximate to the front of the shell, the second connectors being complementary to the first connectors wherein the strap is configured for positioning around the engine compartment of the leaf blower positioning each second connector for removably coupling to a respective first connector for coupling the shell to the engine compartment, the second connector and the respective first connector comprising a hook and loop fastener.

6. The device of claim 1, further comprising:
    a left side panel selectively couplable to the front of the shell proximate to the first side of the shell such that the left side panel partially covers the first cutout; and
    a right side panel hingedly coupled to a second side of the shell and selectively couplable to the front of the shell proximate to the second side of the shell such that the right side panel partially covers the first cutout and such that the left side panel and the right side panel are positioned for rigidifying the front of the shell and for closing gaps between the shell and the engine compartment of the leaf blower.

7. The device of claim 6, further including a pair of hinges, each hinge being coupled to and extending between the right side panel and the second side of the shell such that the right side panel is hingedly coupled to the shell.

8. The device of claim 6, further comprising:
a pair of second hook and loop fasteners coupled to and extending between the left side panel and the shell such that the left side panel is selectively couplable to the shell; and
a pair of third hook and loop fasteners coupled to and extending between the right side panel and the shell such that the right side panel is selectively couplable to the shell.

9. A sound attenuation device comprising:
a shell defining an interior space, the shell being insulated, the shell comprising at least one of polyurethane coated polyester, polyethylene, and plastic such that the shell is substantially impermeable to water, the shell being substantially rectangularly box shaped, the shell having a back comprising a first section and a second section, the first section extending perpendicularly from a bottom of the shell, the second section extending transversely from the first section to a top of the shell such that the top is circumferentially smaller than the bottom;
a first panel positioned in the interior space and coupled to the back of the shell such that the first panel is positioned for rigidifying the back, the first panel comprising paperboard;
a second panel positioned between the first panel and the shell, the second panel comprising foamed elastomer wherein the second panel is configured for acoustic dampening, the second panel comprising extruded polystyrene foam;
an insulation layer positioned in the interior space and coupled to an inner surface of the shell wherein the insulation layer is configured for acoustic dampening, the insulation layer comprising high-temperature mineral wool such that the insulation layer is fire resistant;
a mesh coupled to and overlaying the insulation layer, the mesh comprising metal wherein the mesh is configured for protecting the insulation layer from physical damage from contacting the engine compartment of the leaf blower;
a first cutout positioned in a front of the shell, the first cutout being shaped substantially complementarily to an engine compartment of a leaf blower, the first cutout extending from the bottom of the shell to proximate to the top of the shell, the first cutout being arcuate distal from the bottom such that the first cutout is shaped substantially complementarily to a front edge of the engine compartment of the leaf blower;
a second cutout extending from the front of the shell into a first side of the shell, the second cutout being shaped substantially complementarily to a cross-sectional profile of a pipe of the leaf blower wherein the first cutout is configured for inserting the engine compartment of the leaf blower into the interior space such that the pipe extends from the shell through the second cutout, the second cutout being positioned proximate to the bottom of the shell, the second cutout being contiguous to the first cutout;
a third cutout extending from the front of the shell into the top of the shell, the third cutout being contiguous to the first cutout, the third cutout being shaped substantially complementarily to a handle of the leaf blower wherein the third cutout is configured for inserting the handle concurrently with the engine compartment of the leaf blower being inserted through the first cutout into the interior space;
a coupler coupled to the shell proximate to the front, the coupler being configured for coupling the shell to the leaf blower such that the shell substantially encapsulates the engine compartment wherein the shell is configured for attenuating sound generated by an engine of the leaf blower, the coupler comprising:
a strap,
a pair of first connectors, each first connector being coupled to the strap proximate to a respective opposing end of the strap, and
a pair of second connectors, the second connectors being coupled singly to the first side and a second side of the shell proximate to the front of the shell, the second connectors being complementary to the first connectors wherein the strap is configured for positioning around the engine compartment of the leaf blower positioning each second connector for removably coupling to a respective first connector for coupling the shell to the engine compartment, the second connector and the respective first connector comprising a hook and loop fastener;
a first orifice positioned in the back of the shell and extending through the second panel, the first panel, and the insulation layer, the first orifice being positioned proximate the first side of the shell wherein the first orifice is configured for aligning with an exhaust port of the engine of the leaf blower for venting exhaust from the interior space;
a plug positioned in the first orifice, the plug comprising steel wool where the plug is configured for venting of exhaust from the interior space and for attenuating the sound generated by the engine of the leaf blower;
a plurality of perforations positioned in the back of the shell proximate the second side of the shell, the plurality of perforations being circularly arranged such that the plurality of perforations is positioned for creating a second orifice through the shell, the second panel, the first panel, and the insulation layer wherein the second orifice is configured for aligning with an exhaust port of the engine of the leaf blower for venting exhaust from the interior space;
a left side panel selectively couplable to the front of the shell proximate to the first side of the shell such that the left side panel partially covers the first cutout;
a right side panel hingedly coupled to the second side of the shell and selectively couplable to the front of the shell proximate to the second side of the shell such that the right side panel partially covers the first cutout and such that the left side panel and the right side panel are positioned for rigidifying the front of the shell and for closing gaps between the shell and the engine compartment of the leaf blower;
a pair of hinges, each hinge being coupled to and extending between the right side panel and the second side of the shell such that the right side panel is hingedly coupled to the shell;
a pair of second hook and loop fasteners coupled to and extending between the left side panel and the shell such that the left side panel is selectively couplable to the shell; and
a pair of third hook and loop fasteners coupled to and extending between the right side panel and the shell such that the right side panel is selectively couplable to the shell.

* * * * *